(12) United States Patent
Mendler et al.

(10) Patent No.: US 10,767,335 B2
(45) Date of Patent: Sep. 8, 2020

(54) ATTACHMENT FOR DRILLING AND/OR FOUNDATION WORK

(71) Applicant: Liebherr-Werk Nenzing GmbH, Nenzing (AT)

(72) Inventors: Maximillan Mendler, Feldkirch (AT); Sebastian Wedl, Feldkirch (AT); Andreas Schwarzhans, Schruns (AT); Armin Englstler, Dalaas (AT); Bernhard Schneider, Klaus (AT); Tobias Griesemer, Nüziders (AT)

(73) Assignee: Liebherr-Werk Nenzing GmbH, Nenzing (AT)

( * ) Notice: Subject to any disclaimer, the term of this patent is extended or adjusted under 35 U.S.C. 154(b) by 0 days.

(21) Appl. No.: 16/283,079

(22) Filed: Feb. 22, 2019

(65) Prior Publication Data

US 2019/0264412 A1 Aug. 29, 2019

(30) Foreign Application Priority Data

Feb. 26, 2018 (DE) .................. 10 2018 104 332

(51) Int. Cl.
| | |
|---|---|
| *E02D 7/00* | (2006.01) |
| *E02D 7/26* | (2006.01) |
| *E02D 7/18* | (2006.01) |
| *E02D 7/22* | (2006.01) |
| *E02D 7/28* | (2006.01) |
| *E21B 7/20* | (2006.01) |
| *G05B 19/042* | (2006.01) |

(Continued)

(52) U.S. Cl.
CPC .................. *E02D 7/26* (2013.01); *E02D 7/18* (2013.01); *E02D 7/22* (2013.01); *E02D 7/28* (2013.01); *E02D 13/04* (2013.01); *E21B 3/025* (2013.01); *E21B 7/02* (2013.01); *E21B 7/20* (2013.01); *E21B 44/00* (2013.01); *G05B 19/042* (2013.01); *H04L 12/40032* (2013.01); *E02D 2600/10* (2013.01); *G05B 2219/45129* (2013.01); *H04L 2012/4026* (2013.01); *H04L 2012/40215* (2013.01)

(58) Field of Classification Search
CPC .... E02D 7/26; E02D 7/18; E02D 7/22; E02D 7/28; E21B 7/20
See application file for complete search history.

(56) References Cited

U.S. PATENT DOCUMENTS 7,413,021 B2 * 8/2008 Madhavan ............. B21D 39/04
166/380
8,672,587 B2 * 3/2014 Mack .................... E02D 31/002
405/227

(Continued)

FOREIGN PATENT DOCUMENTS

| DE | 103 60 912 B3 | 12/2003 |
| DE | 10 2015 105 908 A1 | 10/2016 |
| JP | S59-15124 A | 1/1984 |

*Primary Examiner* — Benjamin F Fiorello
(74) *Attorney, Agent, or Firm* — Dilworth & Barrese, LLP

(57) ABSTRACT

The present invention relates to an attachment for drilling and/or foundation work, in particular a casing oscillator or casing rotator, comprising a receiving apparatus for clamping at least one pipe and a drive for generating a rotational movement of the clamped pipe, wherein the attachment comprises at least one integral control unit for an independent carrying out of control functions of the attachment.

14 Claims, 2 Drawing Sheets

(51) Int. Cl.
    *H04L 12/40*     (2006.01)
    *E21B 7/02*     (2006.01)
    *E21B 44/00*     (2006.01)
    *E02D 13/04*     (2006.01)
    *E21B 3/025*     (2006.01)

(56) References Cited

U.S. PATENT DOCUMENTS

| | | | |
|---|---|---|---|
| 9,328,477 B2* | 5/2016 | Goodbourn | E02D 13/04 |
| 2005/0133264 A1* | 6/2005 | Glas | E21B 3/02 |
| | | | 175/51 |
| 2006/0239118 A1* | 10/2006 | Guidry | G01V 1/34 |
| | | | 367/68 |
| 2009/0129870 A1* | 5/2009 | Jones | E02D 13/04 |
| | | | 405/228 |
| 2009/0205820 A1* | 8/2009 | Koederitz | E21B 10/00 |
| | | | 166/250.01 |
| 2012/0072081 A1* | 3/2012 | Lanzl | E21B 7/005 |
| | | | 701/50 |
| 2016/0186552 A1* | 6/2016 | Penn | G05B 15/02 |
| | | | 700/275 |
| 2016/0305234 A1* | 10/2016 | Korherr | E21B 3/02 |
| 2016/0369471 A1* | 12/2016 | Jussel | E02D 7/18 |

\* cited by examiner

ATTACHMENT FOR DRILLING AND/OR FOUNDATION WORK

BACKGROUND OF THE INVENTION

The invention relates to an attachment for drilling and/or foundation work, in particular to a casing oscillator or casing rotator, comprising a reception apparatus for clamping at least one pipe and a drive for generating a rotational movement of the clamped pipe.

During drilling with a hammer grab using an attachment in the form of a casing oscillator/casing rotator, two units that are per se independent work together in the preparation of a pile. The base machine in the form of a cable excavator comprises a grab for excavating a hole. A casing oscillator/casing rotator likewise fastened to the cable excavator serves the clamping of the casing that is to be introduced into the ground by rotational movements synchronously to the excavation.

In accordance with the current prior art, corresponding casing oscillators/casing rotators are directly controlled electrically. The operator can directly actuate the casing oscillator/casing rotator via a control panel of the machine. A control logic for an independent carrying out of functions has not been provided to date. This is not only less comfortable for the operator, but also brings about a certain safety risk since incorrect operations by the operator cannot be recognized or precluded. The operation of a casing oscillator/casing rotator accordingly requires sufficient expertise.

SUMMARY OF THE INVENTION

It is therefore the object of the present invention to improve an attachment of the category with respect to both the operating comfort and the operating efficiency.

This object is achieved by an attachment having the features herein. Advantageous embodiments of the attachment are also the subject herein.

In accordance with the invention, an attachment of the category is added to by at least one integral control unit having a control logit for an independent, in particular fully automatic, carrying out of at least one control function of the attachment. The actuators of the attachment have previously been directly actuated by operator inputs. A monitoring of the performed operations of the piece of working equipment and an automated setting of certain operating conditions were not possible in this manner; it instead all had to be taken over by the operator himself. The attachment in accordance with the invention having a corresponding control logic allows an independent carrying out of control functions without a manual operating input being required for this purpose. The control logic in particular provides a programmatic run through of a plurality of control commands for the actuator actuation. The control logic can consequently be stored as a software program in the control unit. The control unit itself comprises at least one suitable processing unit for executing a software routine and/or for a digital processing of incoming signals/data.

Provision is made in accordance with an advantageous embodiment of the attachment that it includes one or more sensors that are connected to the control unit. The control unit can consequently invoke generated measurement data from the sensors. The control unit is further suitable to evaluate provided sensor data and to optionally take them into account for the carrying out of the control functions.

Suitable sensors are, for example, an inclinometer, a motion or acceleration sensor, pressure sensors, etc. One or more inclinometers can be installed on or at a machine table for receiving and clamping a casing. They, for example, constantly deliver measurement data with respect to the current table inclination to the control unit. Further inclinometers or angle sensors can be fastened to a steering rod or steering cylinder for detecting the state of the steering rod. One or more sensors can be installed for monitoring a clamping mechanism of the machine table to clamp the pipe. Specifically, pressure sensors in clamping cylinders can be used here whose measured values permit a statement on the state of the pipe clamping. The control unit can constantly invoke and record at least some of these measurement data and take them into account for control functions in operation.

In a further advantageous embodiment of the invention, the attachment can additionally comprise a communication interface to enable a data exchange, preferably bidirectionally, with the base machine. A bus system, in particular a CAN bus system, is preferred here. The control unit is then configured so as to invoke machine-relevant parameters of a base machine over the communication interface. Any data that relate to the ongoing operation of the base machine or its configuration can accordingly be invoked and optionally further processed by the control unit. The invoked data can, for example, be taken into account for the carrying out of control functions. This also represents the basic requirement for a processing of control signals of the base machine by the control unit of the attachment. The attachment or the control unit consequently comprises the required technical requirements to make possible an external control of the attachment by a base machine. Operating elements, such as master switches, for example, and/or display means of the base machine can, for example, be used to control the attachment.

It is therefore also conceivable to provide machine-relevant parameters of the attachment over the communication interface so that a base machine has access to the corresponding parameters and can optionally output them via display elements on the base machine.

In accordance with a further embodiment, the attachment can be equipped with at least one display element for reproducing machine-relevant or control-relevant data. The ongoing process state of the attachment can be visually presented via the display element to optimize the operating comfort of the machine for the user. It is likewise conceivable also to have those data displayed that have been invoked in advance over the communication interface. Information with respect to the base machine can accordingly additionally be displayed to an operator of the attachment.

A transmission and/or reception unit can additionally be provided, beside the aforesaid communication interface, to be able to offer a wireless or also wired communication with an external unit. The transmission and/or reception unit ideally works in accordance with a cellular radio standard so that a data exchange with an external unit can take place over a cellular radio network. The transmission and/or reception unit is, however, not restricted to a cellular radio standard, but can rather also work in accordance with other protocols such as wireless LAN, Bluetooth, NFC, etc.

The attachment can procure the required electric and/or hydraulic and/or pneumatic energy from the base machine via suitable supply lines. Alternatively or additionally, the attachment can also comprise its own energy source such as a powerpack.

At least one of the aforesaid control functions includes, in accordance with an advantageous embodiment of the invention, the provision of at least one assistance system for the operation and/or the taking into operation of the attachment. An example for a corresponding assistance system during the taking into operation and also during operation of the attachment is an automatic dressing device for aligning the clamped pipe. During pile foundation, the pipe is as a rule introduced into the ground vertically at a right angle to the surface of the ground. In exceptional cases, with so-called inclined piles, a corresponding angle of inclination can be set with respect to the horizontal or to the surface of the ground. The kinematics of the attachment, in particular a table for clamping the pipe, can be traveled by one or more actuators to adapt the pipe inclination. The integral control unit of the attachment can be configured such that an assisted setting of the pile inclination is carried out by actuating the matching actuators of the attachment. For example, just the input of the wanted desired angle of the pipe is necessary; the control unit then carries out the required operations in a fully automated manner to initially set the desired inclination and/or to monitor and correct it as required during the introduction of the pipe. The control unit can in this process make use of sensor values of the sensor system installed at the attachment. A sensor for detecting the table inclination of the attachment is of particular importance.

An automated depth measurement of the casing can furthermore be carried out by the control unit as an assistance system. In the automated depth measurement, vertical movements of the table are detected by sensors by the control unit. The control unit can determine the already reached casing depth by summing the individual measurements. In particular measurement values of an inclinometer and/or angle transmitter fastened to the steering rod are taken into account for the depth measurement. An advanced optional possibility of the control unit comprises predicting the possible completion time of the casing starting from the determined casing depth. The operator could then have his attention drawn thereto via a display element at an early point in time. Such a prediction facilitates the coordination of subsequent process steps during the pile foundation such as the timely delivery and introduction of the required concrete. To optimize the prediction quality, the control unit can also take account of preceding pile foundation procedures in the environment that typically permit a qualitative statement on the ground properties. The composition of the soil is namely a factor of influence on the achievably maximum advance speed during the casing process. In addition, the control unit could include the current power take-up in the prediction. It is likewise conceivable that ground profiles having information on the ground composition can be input at the attachment and the control unit has access to such ground profiles for the prediction. Alternatively, they could also be invoked as required from external via the transmission and/or reception unit.

In a further advantageous embodiment of the invention, the control unit can be configured so as to transmit an automatic request to increase and/or decrease the hydraulic or pneumatic and/or electric power provided by a base machine via the communication interface to the base machine. For this purpose, the control unit is suitable to determine the current process-dependent power requirement of the attachment and to generate such a request in dependence thereon and to communicate it to the base machine over the communication interface. The total casing process of the attachment is, for example, composed of cyclically recurring single steps that inter alia differ from one another in the required energy take-up. The control unit can request the required energy from the base machine depending on the upcoming single step.

Further possible control functions that are independently carried out by the logic of the control unit are, for example, automatic movement routines for an automatic oscillating device and/or an automatic pipe drawing device. The oscillation movement is understood as an oscillating rotational movement of the clamped pipe in a casing oscillator. In this respect, the pipe is alternately rotated in opposite directions of rotation to achieve a boring movement to introduce the casing into the soil. Oscillating cylinders that effect the corresponding rotational movements by alternating piston movements are preferably provided to carry out the oscillation movement. The proportion of energy that can be converted into a torque of the casing (efficiency) depends on the position of the two oscillating cylinders. The efficiency is high at a small maximum oscillating angle. The greater the maximum oscillating angle is, the smaller the efficiency becomes due to the geometry of the casing oscillator. The optimum maximum oscillating angle results as a function of the currently reached casing depth. A small oscillating angle is in particular optimum with a small drill depth, whereas greater oscillating angles are preferred as the drill depths progress due to a maximum possible axial deformation. The logic of the control unit is aware of this connection and is preferably configured such that the optimum oscillating angle is set in dependence on the detected casing depth. The control unit therefore preferably automatically increases the set oscillating angle as the casing depth progresses.

The same applies in a similar manner with a so-called automatic pipe drawing device by means of which the pipes introduced in advance are to be removed from the ground after the pouring in of the concrete.

Provision can furthermore be made that the control unit comprises at least one memory or is connectable to such a memory to carry out a continuous data recording during the work operation of the attachment. Data are recorded here that are provided by the sensors, on the one hand; furthermore, evaluation data are also to be understood by this that result by the carrying out of possible control functions and also by the evaluation of the sensor data.

Such data can also be transmitted via the cellular radio network via the installed transmission and/or reception unit to an external server that stores and manages them. The server can then be accessed by further units to thus poll data directly and remote from the construction site. This brings about a plurality of improvements; for instance, a time saving due to a direct data polling for the construction site manager, for example. This further permits a more efficient documentation of the work processes and thus also increases the work quality by direct data access.

In addition to the attachment in accordance with the invention, the invention moreover relates to a system comprising a base machine, in particular a cable excavator or a drilling rig, and an installed attachment in accordance with the present invention. The same advantages and properties consequently result for the system such as have already been discussed above with reference to the attachment in accordance with the invention. A repeat description is accordingly dispensed with.

BRIEF DESCRIPTION OF THE DRAWINGS

Further advantages and properties of the invention will be explained in the following in more detail with reference to an embodiment shown in the Figures. There are shown.

DESCRIPTION OF THE PREFERRED EMBODIMENTS

Figure 1:
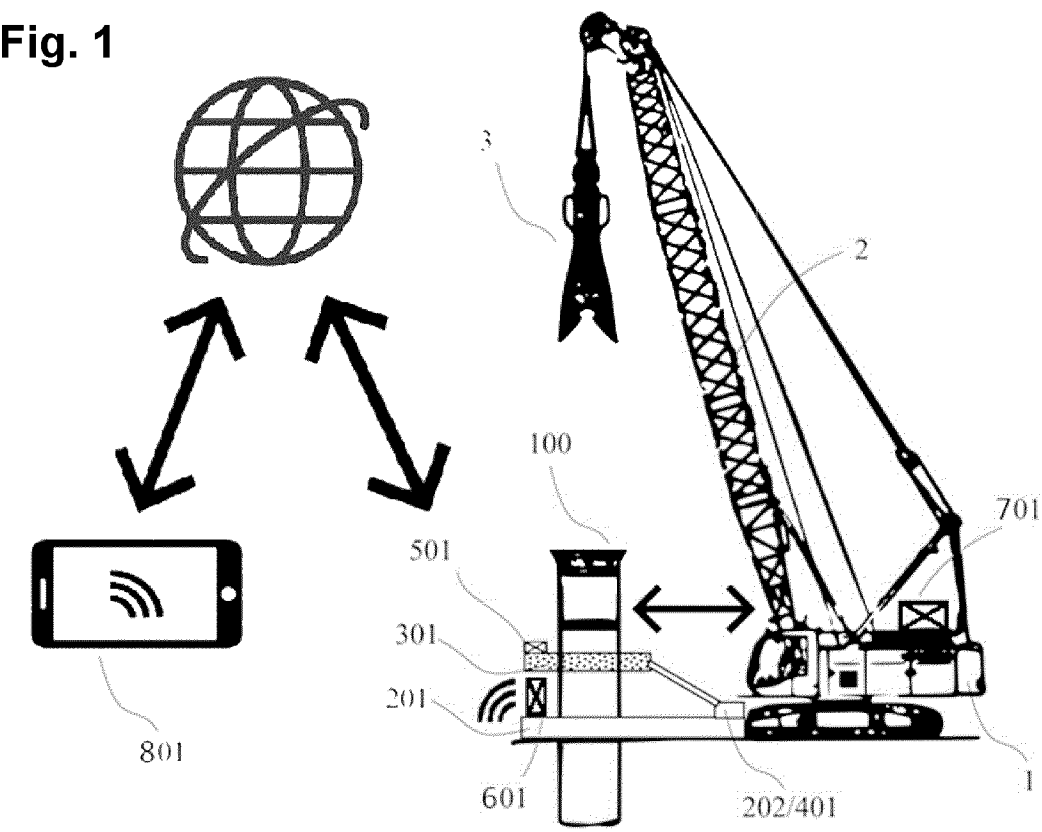
FIG. 1: a sketched side view of the system in accordance with the invention comprising a cable excavator and the casing oscillator in accordance with the invention.

During drilling with a hammer grab using a casing oscillator, two units that are independent per se, that is, a cable excavator 1 and the attachment of the cable excavator 1 in the form of the casing oscillator, work together to prepare a pile. As is shown by way of example in FIG. 1, the cable excavator 1 comprising a slewable superstructure, a boom 2, and a grab 3 takes over the excavation of a hole. A casing oscillator comprising a base plate 201 and a table 301 adjustable in distance with respect to the base plate 201 is attached to the cable excavator 1. A casing 100 can be driven into the ground by this casing oscillator in the following manner. The table 301 is, for example, latched to the casing 100 with the aid of a clamping cylinder. The base plate 201 is subsequently raised, whereby the weight force of the casing 100, of the table 301, and of the base plate 201 acts downwardly. To overcome the sticking friction, the table 301 is set into motion in a further step, for example into horizontal oscillations (so-called casing oscillators) or also into continuous rotation (so-called casing rotators). The casing 100 is lowered into the ground by this interplay while the cable excavator 1 excavates the soil within the casing.

Figure 2A:
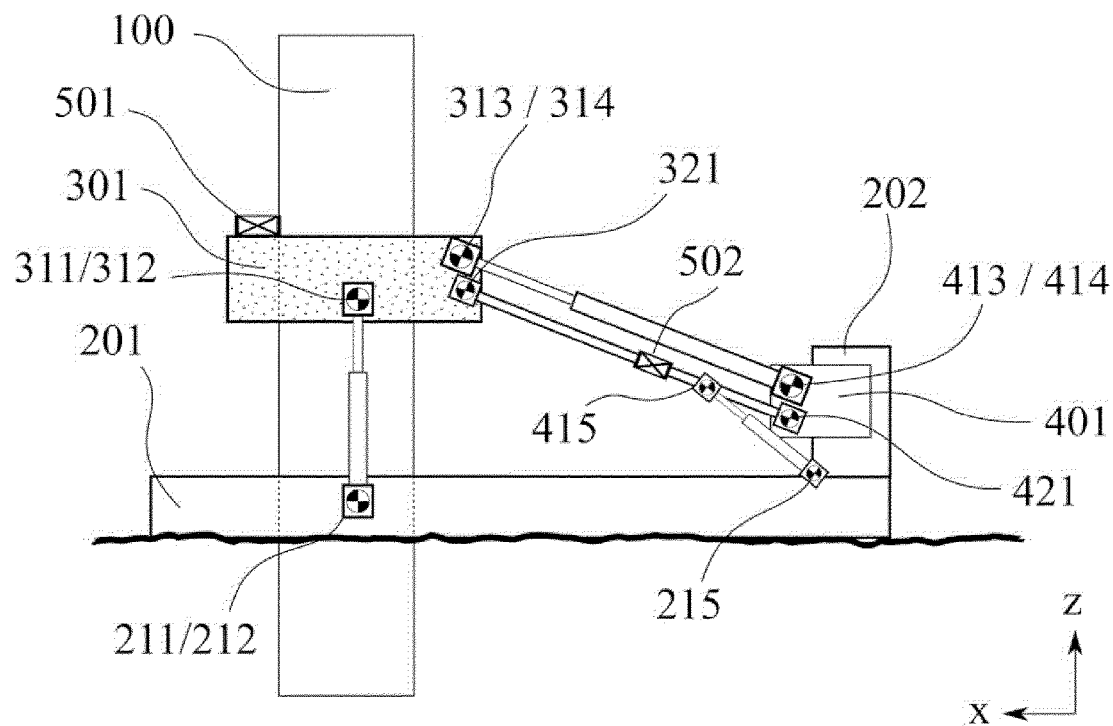
FIGS. 2a, 2b: a side view and a plan view of the casing oscillator in accordance with the invention.
Figure 2B:
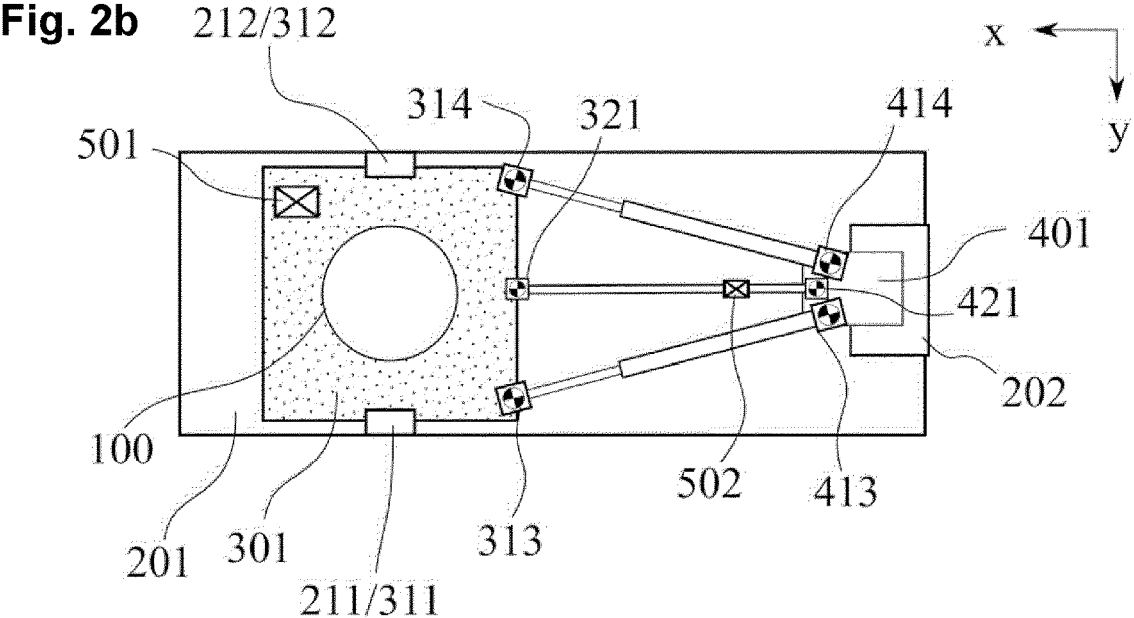

The casing oscillator is shown with more details in FIGS. 2a, 2b that show the casing oscillator with the casing 100 in a side view and in a plan view. The table can, for example, be clamped to the pipe 100 by means of clamps. The base plate 201 can be raised between the connection points 211/311 and 212/312 by lifting cylinders. The table 301 can carry out rotational movements with respect to the base plate 201 by synchronized movements of the two oscillation cylinders between the connection points 313/413 and 314/414. A rigid steering rod is installed at the table 301 in articulated fashion at the point 321, on the one hand, and is installed in articulated fashion at the point 421 at the element 401, on the other hand. The inclination of the casing 100 about the y axis can be set by movement of a steering cylinder that is installed in an articulated manner at the steering rod at the point 415, on the one hand, and in articulated manner at the base plate 201 at the point 215. The inclination of the casing 100 about the x axis can thereby be set by different stroke heights of the two lifting cylinders. The centers of rotation 413, 414, and 421 can be displaced by means of the guide 401 horizontally with respect to the structure 202 fixedly connected to the table 201. An inclinometer 501 that is fastened to the table 301 detects the current inclination of the table 301. The inclinometer 502 installed at the steering rod detects the current inclination of the steering rod. The hydraulic and electric energy for the operation of the casing oscillator is provided by the base machine 1.

The casing oscillator shown further comprises a control unit that receives and evaluates the measurement values of the sensors 501, 502 and takes them into account for the control of the actuators, i.e. of the lifting cylinders, of the steering cylinder, of the clamping cylinders, and of the oscillating cylinders. Control-relevant data can additionally be output during the running time via a display means of the casing oscillator. The casing oscillator can take over control work and carry out intelligent functions such as assistance systems independently with the aid of the control unit. Functions for communication with the base machine 1 and with a (machine data) server are likewise available. Machine data can be collected independently of the base machine 1 and can be transmitted to a server. A querying of machine data should thereby be made possible remote from the construction site and in an uncomplicated manner.

A display of (evaluated) data should be presented to the operator (on the control panel). This should additionally make possible different assistance functions and automated routines independently of the base machine 1.

There are Inter Alia Made Possible:
independent depth measurement of the casing/of the drilling pipe and prediction of the completion of the pile via monitoring of the depth;
an automatic request for or reduction of hydraulic power in dependence on the process-dependent requirements of the casing oscillator (VRM) and of the availability at the base machine 1;
automatic movement routines such as an automatic oscillating system, automatic pipe drawing device, and further sequences carried out in an automated manner that can also be stopped when, for example, a specific parameter is reached. The determination of the optimum oscillating angle additionally takes place as a function of the depth; and
automatic dressing system: The alignment of the verticality of the pipe 100 takes place by an internal logic of the control unit.

The processing of control signals of a base machine 1 becomes possible for the first time by the control unit on the attachment. Existing operating elements (master switch, master display, . . . ) can thus be used on the base machine 1.

The communication between the VRM and the base machine 1 is made possible via a CAN bus. Here, the respective control units transmit and receive data that can additionally be used for combined evaluations. Information from the attachment machine and base machine 1 is directly presented to the operator (operator in the cabin+operator outside with control panel) by this connection, whereby work becomes more efficient. The transmitted data are shown graphically, and optionally in converted form, on the control panel of the base machine 1.

The control unit of the VRM in conjunction with an independent transmission and reception unit of the VRM provide a data transmission via the cellular radio network to an external server that saves and manages these data.

The server can be accessed via further units 801 and data can thus be queried directly and remote from the construction site. This brings about a plurality of improvements:
time saving by direct data querying for e.g. the construction site manager;
more efficient documentation; and
increased work quality by direct data access.

To ensure a seamless data recording, a temporary and permanent data storage is possible in the VRM by at least one memory element. Important information such as the service life consumption of individual components can hereby be saved independently of the base machine 1 at which the attachment is currently being used. The saved data are additionally available for evaluations and thus represent a basis for e.g. automation and assistance systems.

The data measurement takes place directly at the attachment, whereby a high variety of data can be detected and additionally a high measurement accuracy can be achieved. A seamless machine data and process data recording is ensured—independently of the mode of operation (external unit, powerpack, separate unit)—by the integrated control unit that independently controls the recording and monitoring.

A self-monitoring of the VRM is additionally made possible by the control unit. A large number of improvements in the total process "introducing a pipe into the ground" can be achieved with the aid of the recorded data and their evaluation. Processes can run more precisely and faster and the operator is relieved of workload by automated processes. Process routines are furthermore assisted with the help of assistance systems, whereby the process quality is increased and the operating effort is decreased. Incorrect operations are greatly reduced or precluded. The integrated control unit can additionally e.g. be used for forecasts or prioritization of work processes. Safety at the workplace is improved overall since the work in the hazardous zone (zone at and around the attachment) is reduced.

A prediction on when the pile is completed can be prepared via a monitoring of the depth to e.g. set the time boundaries for the delivery of the concrete for the pile. This prediction can be made more accurately in a further sequence by a recording of "ground profiles" of adjacent piles. They e.g. display the strength of the ground as a function of the depth.

The following takes place on a change of the direction of rotation of the VRM: the rotation of the casing 100 stops and the two oscillating cylinders change their lifting directions. Initially, a sticking friction acts between the pipe and the ground that is generally higher than the dynamic friction. As soon as the sticking friction has been overcome over the total casing 100, the pipe 100 rotates over its whole length; only the dynamic friction still acts. The casing 100 is now further introduced into the ground by its own weight and by the additional weight of the VRM. The following effects influence this behavior:

- The proportion of energy that can be converted into a torque of the casing 100 (efficiency) depends on the position of the two oscillating cylinders. The efficiency is high at a small maximum oscillating angle. The greater the maximum oscillating angle is, the smaller the efficiency becomes due to the geometry of the VRM.
- This behavior is counteracted, on the one hand, by smaller slipping between the individual elements of the casing 100, but also by a possible axial deformation over the total length of the casing 100. It may occur with a long casing that the pipes 100 already rotate at the surface of the ground, but that this rotation does not extend at the very bottom at the tip; and
- It can be recognized: the optimum maximum oscillating angle is therefore a function of the depth. Whereas a small oscillating angle is optimum at a small drilling depth due to the efficiency, a large oscillating angle becomes optimum at large drilling depths due to a possible axial deformation.

The energy effort can therefore, on the one hand, as in the previously described paragraph, be optimized by setting the energy distribution; as a second parameter, the maximum oscillating angle can also be set as a function of the depth.

There follows a brief example of use for the use of the VRM for pile foundation:

A VRM attached to a cable excavator 1 is controlled by an operator in the operator's cabin or by an operator using a control panel. The VRM has an integrated control unit that is used as the basis for automation and for assistance systems. Machine-related and process-related data can be presented to the operator by the data recording and by the communication (data exchange) of the control units of the VRM and of the cable excavator 1. A combined evaluation and representation of the data is also possible by the linking of the data. Recorded and evaluated data are transmitted from the VRM and the cable excavator 1 via a connection to a server. The construction site manager can e.g. review the data on this server at his mobile device 801 and can thus monitor the work routine without having to be directly present in situ. Some processes of the manual data recordings (spirit level for measuring the vertical deviation of the pipe 100, reading the introduction depth, etc.) can be reduced by the digital representation of the data.

The invention claimed is:

1. An attachment for drilling and/or foundation work, comprising a reception apparatus for clamping at least one pipe and a drive for generating a rotational movement of the clamped pipe, wherein the attachment comprises
    at least one integral control unit having a control logic for an independent carrying out of at least one control function of the attachment and at least one communication interface for communication with a base machine, with the control unit invoking machine-relevant parameters of the base machine via the communication interface and/or providing machine-relevant parameters of the attachment via the communication interface,
    at least one transmission and reception unit is provided to enable a wireless and/or wired communication with at least one external unit, and
    at least one control function is the control of automatic movement routines for an automatic oscillating system and/or an automatic pipe drawing device.

2. An attachment in accordance with claim 1, wherein the attachment comprises one or more sensors whose sensor data can be read by the control unit and can be evaluated and can be taken into account for the carrying out of the control functions.

3. An attachment in accordance with claim 1, wherein control commands for controlling the attachment can be received via the communication interface and can be interpreted by the control unit to control one or more actuators of the attachment and/or to carry out control functions of the control unit.

4. An attachment in accordance with claim 1, wherein the attachment comprises at least one display element for reproducing the machine-relevant or control-relevant data and/or data invoked via the communication interface.

5. An attachment in accordance with claim 1, wherein an electric and/or hydraulic and/or pneumatic supply of the attachment can be provided via an interface by a base machine.

6. An attachment in accordance with claim 1, wherein at least one control function is the provision of at least one assistance system for operation and/or putting into operation the attachment.

7. An attachment in accordance with claim 6, wherein the control unit is configured to carry out an assisted setting of the pile inclination during which the control unit controls one or more actuators to set the desired pipe inclination while taking account of the sensor values.

8. An attachment in accordance with claim 6, wherein the control unit is configured to carry out an automated depth measurement of the casing/of the drilling pipe as an assistance system and optionally to prepare and output a prediction with respect to the completion of the pile.

9. An attachment in accordance with claim 1, wherein the control unit is configured to generate an automatic request to increase and/or to decrease the hydraulic power provided by a base machine in dependence on the process-dependent power requirement of the attachment and to transmit it via the communication interface.

10. An attachment in accordance with claim 1, wherein the control unit comprises or is connectable to at least one memory to carry out a continuous data recording during the work operation of the attachment.

11. An attachment in accordance with claim 1, wherein the communication interface is a CAN bus.

12. An attachment in accordance with claim 1, wherein the wireless and/or wired communication with the at least one external unit takes place via a cellular radio network.

13. An attachment in accordance with claim 1, wherein the machine-relevant and/or control-relevant parameters of the attachment are able to be transmitted to an external server via the transmission unit.

14. A system comprising a base machine, including
an excavating assembly for excavating a borehole, and
at least one attachment installed at the base machine independently from the excavating assembly and for introduction of a casing into a around simultaneously with excavating, wherein
the attachment comprises at least one integral control unit having a control logic for an independent carrying out at least one control function of the attachment,
the excavating assembly comprises a grab for excavating the borehole, and
the attachment is configured to rotate or oscillate the casing clamped thereto to introduce the casing into the ground by rotational movements synchronously to the excavation.

* * * * *